United States Patent [19]
Wolber

[11] 4,141,326
[45] Feb. 27, 1979

[54] CLOSED LOOP CONTROL SYSTEM FOR HYDROGEN FUELLED ENGINE

[75] Inventor: William G. Wolber, Southfield, Mich.

[73] Assignee: The Bendix Corporation, Southfield, Mich.

[21] Appl. No.: 776,793

[22] Filed: Mar. 11, 1977

[51] Int. Cl.² ............................................. F02B 3/00
[52] U.S. Cl. ..................... 123/119 EC; 123/DIG. 12; 123/119 E; 123/120; 123/32 EE
[58] Field of Search ............... 123/DIG. 12, 3, 119 E, 123/120, 119 EC, 32 EE

[56] References Cited
U.S. PATENT DOCUMENTS 4,043,300   8/1977   Lombard ........................ 123/32 EE

*Primary Examiner*—Wendell E. Burns
*Attorney, Agent, or Firm*—James R. Ignatowski; Russel C. Wells

[57] ABSTRACT

Disclosed herein is a closed loop fuel control system for a hydrogen fuelled engine embodying a hydrogen sensor in the exhaust manifold to provide a feedback signal indicative of the quantity of unburned hydrogen in the engine's exhaust. The system electronically controls or trims the fuel delivery to the engine in response to signals indicative of the engine's operating parameters and the signal generated by the hydrogen sensor to maintain the concentration of hydrogen in the exhaust at a predetermined level.

33 Claims, 11 Drawing Figures

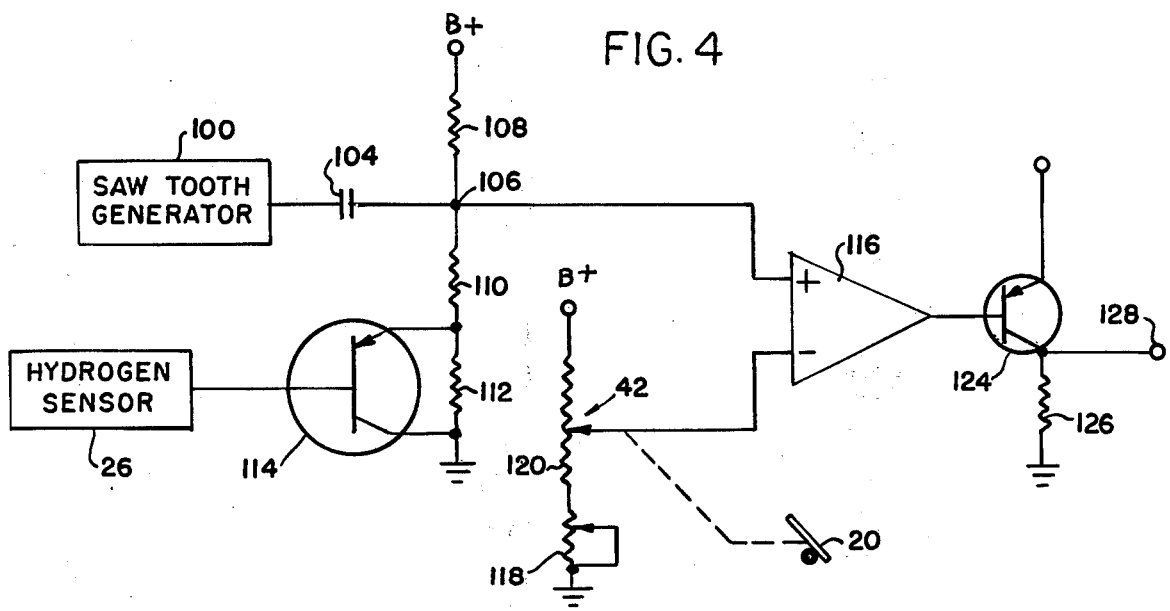
FIG. 4
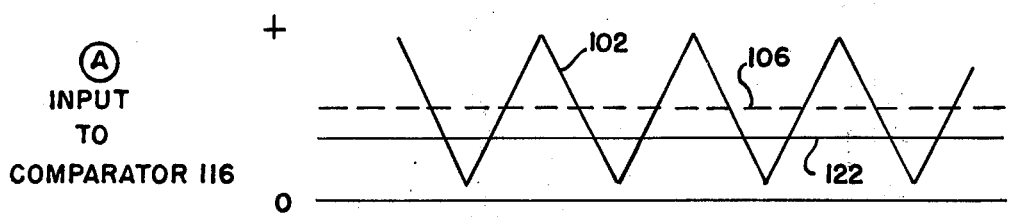
FIG. 5
Ⓐ INPUT TO COMPARATOR 116
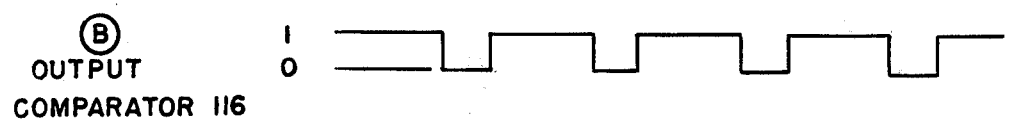
Ⓑ OUTPUT COMPARATOR 116
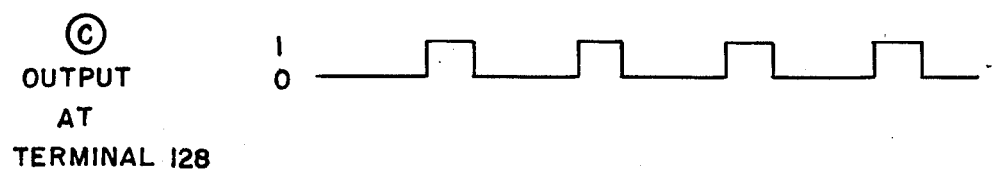
Ⓒ OUTPUT AT TERMINAL 128

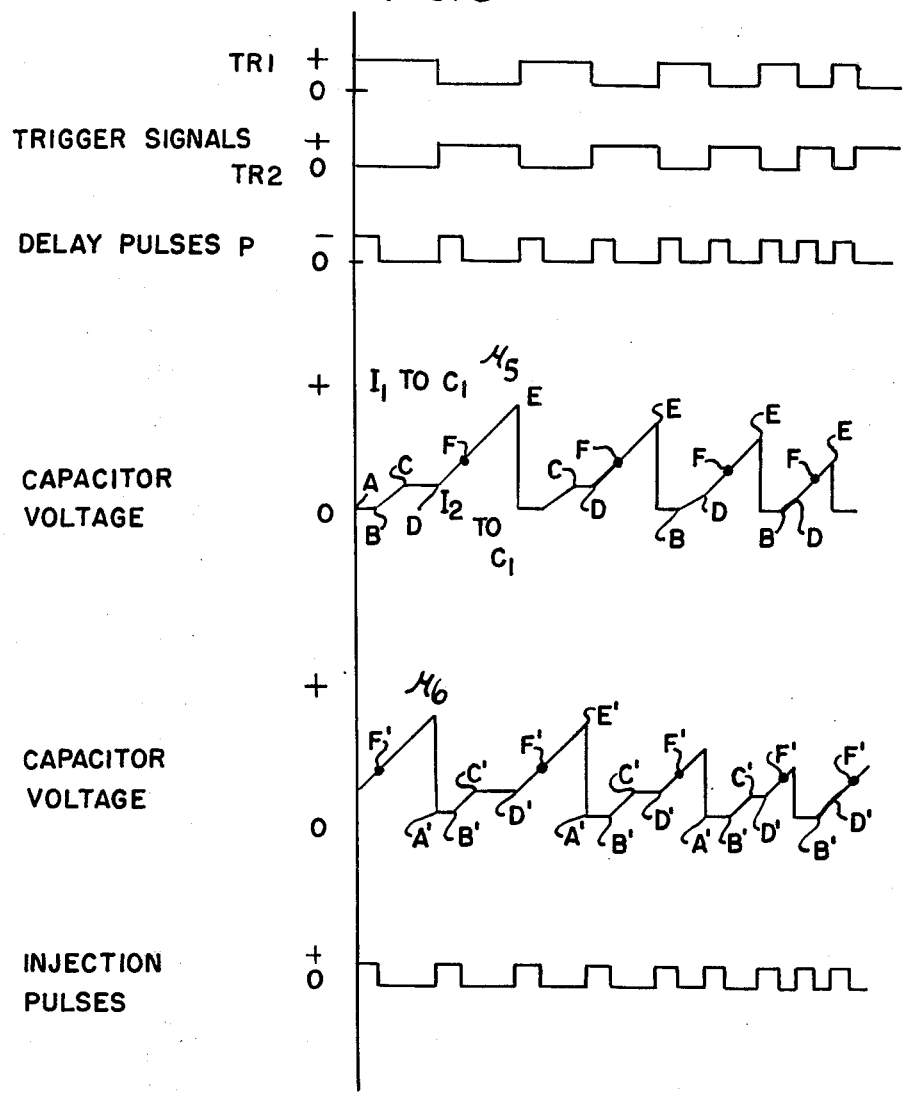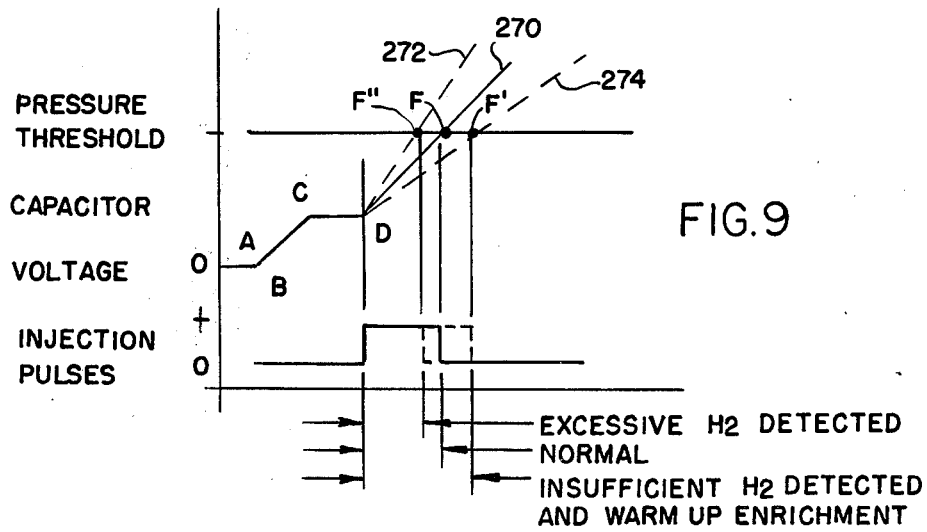

CLOSED LOOP CONTROL SYSTEM FOR HYDROGEN FUELLED ENGINE

BACKGROUND OF THE INVENTION

1. Field of the Invention

The invention relates to fuel control systems and, in particular, to a closed loop fuel control system for an internal combustion engine using hydrogen as a fuel.

2. Prior Art

Presently internal combustion engines use fossil or hydrocarbon type fuels. The world supply of fossil fuels, as we know, is limited and already the scientific community is looking at alternatives to the hydrocarbon fuels. Added to this, ecological problems stemming from the widespread use of hydrocarbon fuels is hastening the development of alternate relatively pollution-free alternates. One of the primary candidates as an alternate fuel is hydrogen, which is in abundant supply, and its by-product of combustion is water, which is not considered as a pollutant. Considerable research using hydrogen as a fuel is underway and operative engines using hydrogen as a fuel have been built and tested. The use of hydrogen as a fuel is taught by Billings in U.S. Pat. No. 3,983,882 (October 1976). This concept was also taught by A. F. Bush and W. D. Van Vorst in a paper presented at the Cryogenic Conference, Aug. 8–10, 1973 from Advances in Cryogenic Engineering Underwood in U.S. Pat. No. 3,862,624 (January 1975) and Smith in U.S. Pat. No. 3,608,529 (September 1971) also teach the use of hydrogen as a fuel. The hydrogen fuelled engine systems taught by the prior art cited above are open loop systems and must be periodically adjusted to assure optimum performance and optimum fuel economy.

The more advanced electronically controlled fossil fuel systems are tending towards closed loop systems in which the oxygen content of the exhaust is continuously monitored to provide a correction to the quantity of fuel being delivered to the engine to compensate for degradation, wear, or other changes in the engine's fuel/air delivery system, as well as for subtle changes in the operating characteristics of the engine. A typical example of one such closed loop electronically controlled fossil fuel system is taught by Seitz in U.S. Pat. No. 3,815,561 (June 1974).

The present invention is a closed loop electronic control system for a hydrogen fuelled engine using a sensor detecting the quantity of unburned hydrogen in the engine's exhaust.

SUMMARY OF THE INVENTION

The invention is a closed loop fuel control system for a hydrogen fuelled engine using a sensor generating a feedback signal indicative of the quantity of unburned hydrogen in the exhaust gas emitted by the engine. The quantity of fuel delivered to the engine is electronically controlled in response to inputs indicative of the quantity of air being delivered, as well as other operating parameters of the engine. A hydrogen sensor monitors the composition of the exhaust gas, and generates a feedback signal indicative of the quantity of unburned hydrogen. The feedback signal is applied to the fuel delivery system and modifies the fuel being delivered to maintain a predetermined quantity of unburned hydrogen in the exhaust.

The object of the invention is a closed loop fuel control system for a hydrogen fuelled engine.

Another object of the invention is a closed loop fuel control system for a hydrogen fuelled engine using a hydrogen sensor to detect the quantity of unburned hydrogen in the engine's exhaust.

Still another object of the invention is a closed loop fuel control system for a hydrogen fuelled engine in which the quantity of unburned hydrogen is maintained at a predetermined level.

Another object of the invention is a closed loop fuel control system for a hydrogen fuelled engine in which an enriched fuel mixture is provided during the transitional warm-up period.

These and other objects will become apparent from reading the detailed description of the preferred embodiment in conjunction with the drawings.

BRIEF DESCRIPTION OF THE DRAWINGS

FIG. 4 is a circuit diagram of the electronic unit of FIG. 3.

FIG. 5 is waveforms used in the description of the circuit diagram of FIG. 4.

FIG. 8 is waveforms used in the description of the schematic shown on FIG. 7.

FIG. 9 is a waveform used in the description of the operation of the feedback portion of the electronic control unit shown in FIG. 7.

DESCRIPTION OF THE PREFERRED EMBODIMENT

Figure 1:
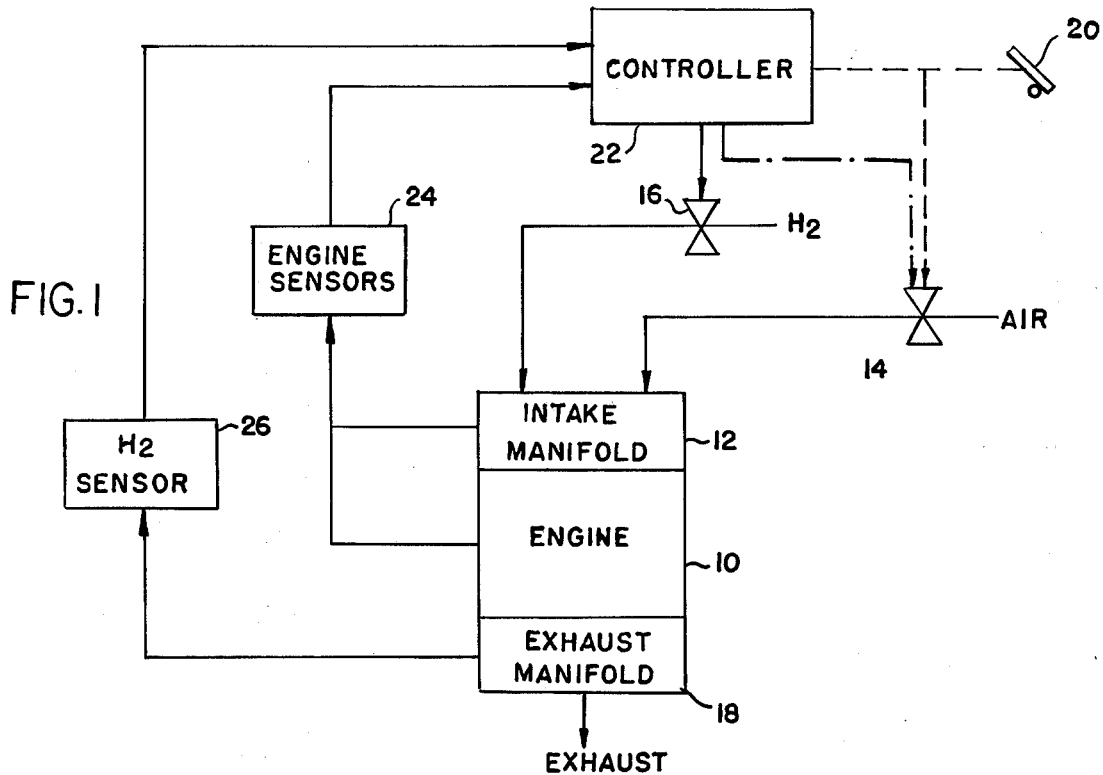
FIG. 1 is a block diagram of the closed loop fuel control system for a hydrogen fuelled engine.

The basic concept of the closed loop fuel control system for a hydrogen fuelled engine is shown in FIG. 1. An engine 10 has an intake manifold 12 receiving a controlled quantity of air or oxygen from an external source through an air control valve 14 and a controlled quantity of hydrogen fuel through a fuel control valve 16. The exhaust gases generated by the engine 10 are emitted into an exhaust manifold 18 prior to being exhausted to the atmosphere. The air control valve 14 may be a typical butterfly valve, as used in contemporary automotive internal combustion engines, or may be of any other known configuration. The air control valve may be operator-actuated by means of a suitable control, such as the conventional accelerator foot pedal 20, or may be indirectly controlled by servo mechanisms responding to the signals generated by an electronic control unit, such as controller 22, as is well known in the art. Fuel delivery is controlled by a fuel control valve 16 in response to signals generated by controller 22. The controller 22 may receive inputs from the accelerator foot pedal 20, as well as engine sensors 24 generating signals indicative of the engine's operating parameters. The engine sensors 24 may comprise a mass air flow sensor generating a signal indicative of the quantity of air flow to the engine through the intake manifold or, alternatively, an engine speed sensor generating a signal indicative of the engine speed and an intake manifold pressure sensor, or any other sensor detecting an engine operating parameter which may be utilized in the controller for computing the amount of required fuel. The controller 22 also receives an input from a hydrogen sensor 26 detecting the quantity of hydrogen present in the exhaust gases in the exhaust manifold 18. The hydrogen sensor 26 may be of the type disclosed by C. C. Matle et al in U.S. Pat. No. 3,242,717 (March 1966). This sensor utilizes a palladium sensor film which changes its electrical conductivity upon exposure to hydrogens in an amount corresponding to the concentration of hydrogen passing over the palladium film.

The operation of the system is as follows: The controller 22 responds to the input from the operator through the accelerator pedal 20 and/or the engine's sensors 24 and generates a control signal indicative of the required quantity of hydrogen and/or air to be admitted into the engine, which actuates the hydrogen control valve 16 and/or air valve 14 to pass the computed quantity of hydrogen and air to the engine. The hydrogen/air mixture is burned in the engine to produce a desired mechanical motion, as in a conventional internal combustion engine, and the burned gases are emitted into the exhaust manifold. The hydrogen sensor detects the quantity of unconsumed hydrogen in the exhaust gases and generates a signal which corrects the signals generated by the fuel delivery controller 22 so that the quantity of unburned hydrogen in the exhaust gases has a predetermined value. As used herein, the term "air" includes the possibility of using relatively pure oxygen gas rather than atmosphere air as the oxidizing agent for the hydrogen fuel.

Figure 2:
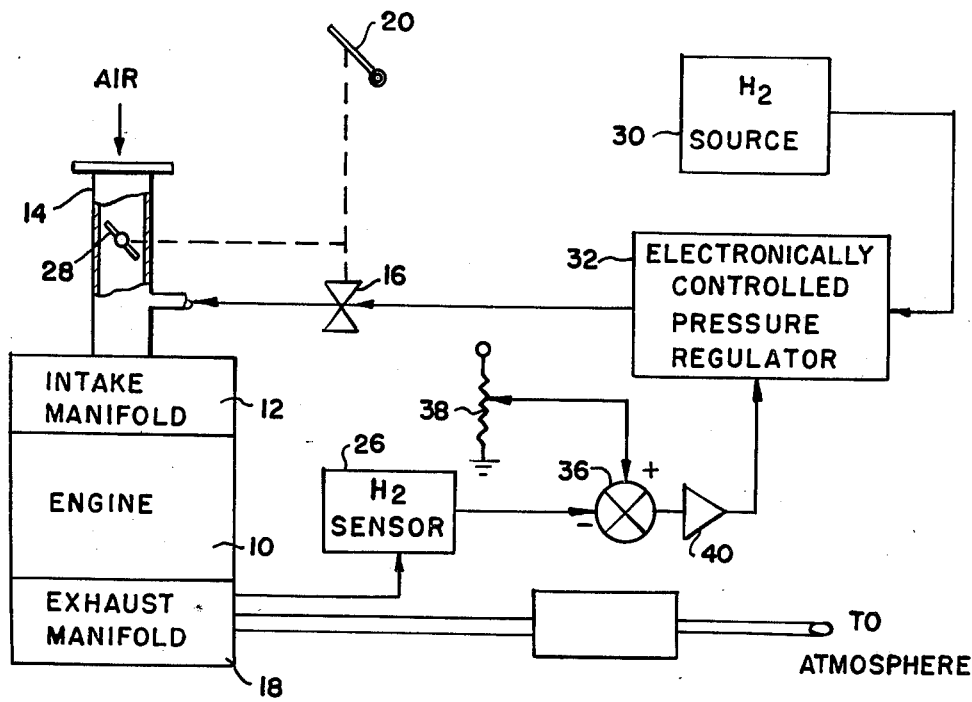
FIG. 2 is a first embodiment in which the feedback from the hydrogen sensor controls the pressure of the hydrogen fuel.

A simplified version of the closed loop hydrogen fuel control system is illustrated in FIG. 2. The system comprises an engine 10 having an intake manifold 12 and an exhaust manifold 18, as previously discussed with reference to FIG. 1. Air is emitted into the intake manifold via the air control valve illustrated as a butterfly valve 28 controlled by mechanical linkages from the operator's foot pedal control 20. The foot pedal 20 also actuates the hydrogen control valve 16 by suitable mechanical linkages to simultaneously provide a proportional quantity of hydrogen fuel to the engine. The hydrogen control valve 16 may be coordinated directly with the operation of the butterfly valve 28 or may be controlled through separate linkages. Hydrogen fuel from a hydrogen fuel storage 30 is communicated to the input of an electronically controlled pressure regulator 32. The output of the pressure regulator 32 is communicated to the input side of the hydrogen fuel control 16, as shown. The hydrogen content in the exhaust gas is monitored by the hydrogen sensor 26 which generates an output signal indicative of the concentration of hydrogen in the exhaust gas. A sum amplifier 34 combines the output signal from the hydrogen sensor with a set point signal generated by a set point generator illustrated as a variable potentiometer 36. The combined signal from the sum amplifier 34 is amplified in a buffer amplifier 36 prior to being communicated to the electronically controlled pressure regulator 22, which is operative to increase or decrease the pressure of the hydrogen gas being communicated to the input of control valve 16.

The operation of the embodiment shown in FIG. 2 is as follows: The position of the air control valve 14 and hydrogen control valve 16 are controlled directly by the actuation of the operator's pedal and, therefore, predetermined quantities of hydrogen and air are admitted to the engine's intake manifold. The hydrogen and air are mixed, then inhaled by the engine where the mixture is burned in a conventional manner to produce the desired mechanical motion. The burned exhaust gases are emitted into the exhaust manifold 18 wherein the hydrogen sensor 26 detects the concentration of unburned hydrogen and generates a signal indicative of the hydrogen concentration. This signal is negatively summed with the set point signal to produce a composite signal, which when amplified by the buffer amplifier 40, produces a signal controlling the pressure at the output of the pressure sensor 32. Since the quantity of hydrogen flowing through the fuel control valve 16 is a function of both the pressure differential across the fuel control valve and the input from the accelerator pedal 20 controlling the pressure effectively controls the quantity of fuel being delivered to the engine. When the detected quantity of hydrogen in the exhaust gas is less than the predetermined amount, the output of the hydrogen sensor 26 is indicative of the decrease in hydrogen content. Since the output of the hydrogen sensor has decreased, the output of the sum amplifier 36 increases. This signal, amplified by the buffer amplifier 40, causes the electronically controlled pressure regulator 32 to increase the pressure at the input end of the hydrogen valve 16 and the quantity of hydrogen input to the engine is increased. Conversely, when the hydrogen content in the exhaust gases is greater than the predetermined amount, the output of the hydrogen sensor 26 increases. This increased output of the hydrogen sensor, when negatively summed with the input from the set point generator 38 in the sum amplifier 36, results in a decreased signal which causes the electronically controlled pressure regulator to decrease the pressure at the input side of valve 16 and consequently decreasing the quantity of fuel delivered to the engine.

Figure 3:
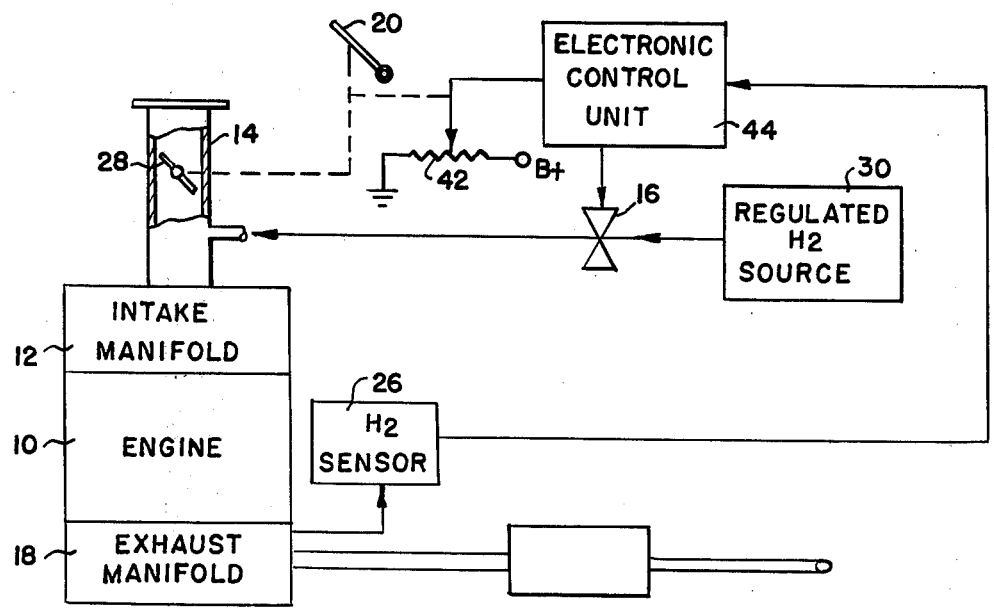
FIG. 3 is a second embodiment using an electronic control unit receiving inputs from a throttle position sensor and the hydrogen sensor.

A slightly different embodiment of the closed loop hydrogen fuel control system is illustrated in FIG. 3. As in previous illustrations, the system comprises an engine 10 having an intake manifold 12 and an exhaust manifold 18. Air is emitted into the intake manifold via the air control valve 14 having a butterfly 28 controlled through mechanical linkages by the operator's foot pedal 20. The operator's foot pedal also actuates the movable contact of a potentiometer 42 and is shown to provide an electrical input to an electronic control unit 44. The electronic control unit 44 also receives an input from the hydrogen sensor 26 and generates an output signal which controls the actuation of hydrogen control valve 16. Hydrogen fuel from a hydrogen source 30 is received at the input of the hydrogen valve 16. The output of valve 16 is connected to the intake manifold via the valve 14.

The operation of the circuit is as follows: The air flow to the engine is controlled directly by the operator's foot pedal 20 which also controls the position of the movable contact of variable potentiometer 42 generating a first signal indicative of the quantity of air being supplied to the engine. The hydrogen sensor 26 generates a signal indicative of the hydrogen content of the gas in the exhaust manifold. The electronic control unit 44 responds to both of these signals and generates an output signal which controls the actuation of valve 16. When the hydrogen content of the exhaust gases is less than desired, the signal generated by the hydrogen sensor decreases. A decreased input from the hydrogen sensor causes the electronic control unit 44 to generate signals actuating valve 16 to increase the delivery of hydrogen gas to the engine. Conversely, when the hydrogen content of the exhaust gas is higher than the predetermined value, the increased output of the hydrogen sensor 26 causes the electronic control unit to generate output signals actuating hydrogen control valve 16 to decrease the delivery of hydrogen fuel to the engine.

The control unit 44 may take many forms. One embodiment of such a control unit capable of performing the desired functions is described with reference to the circuit diagram shown on FIG. 4 and the waveforms shown on FIG. 5. A sawtooth generator 100 generates a sawtooth wave 102 shown on FIG. 5 having a predetermined frequency and a predetermined peak to peak value. The sawtooth wave 102 is passed by a capacitance 104 to junction 106 of a bias control network comprising serially connected resistances 108, 110, and 112 connected between a source of electrical power designated B+ and ground. The B+ and ground symbols have their conventional meaning. A transistor 114 has its emitter connected to the junction between resistances 110 and 112 and its collector connected to ground. The base of transistor 114 receives the signal generated by the hydrogen sensor 26. The potentiometer 42 is shown to comprise serially connected variable resistance 118 and potentiometer 120 having a movable contact 122 actuated by the operator's foot pedal 20. Junction 106 and movable contact 122 are connected to the inputs of comparator 116 and the output of comparator 116 is connected to the base of an output transistor 124. The emitter of transistor 124 is connected directly to B+ and the collector is connected to ground through resistance 126 and to the output terminal 128.

The operation of the circuit is as follows: Considering first the operation when the output of the hydrogen sensor 26 is constant and indicative of the desired quantity of hydrogen in the exhaust gas, the output of the hydrogen sensor 26 applied to the base of transistor 114 causes transistor to conduct forming a parallel current path around resistance 112 effectively setting the bias potential at junction 106. The sawtooth waveform generated by the sawtooth generator 102 is passed by capacitance 104 and is applied to the positive input to comparator 116. The maximum and minimum peak values of the sawtooth wave at the input of the comparator, with reference to ground (0) potential, is determined by the value of the bias potential at junction 106. The output of the movable contact 122 of potentiometer is applied to the negative input of comparator 116. The output of the comparator 116 is a square wave, as shown on waveform B of FIG. 5. This square wave output of comparator 116, when applied to the base of transistor 124, produces a complementary square wave signal at the output terminal 128, as shown on waveform C of FIG. 5. The variable resistance 118 determines the minimum value of the signal at movable contact 122 when the operator's pedal 20 is in its rest or idle position and functions as an idle control. It is already seen that as the potential movable contact 122 increases in response to depressing the foot pedal 20, the width of the pulses at output terminal 128 increases. These pulses at output terminal 128 may control a simple ON-OFF hydrogen control valve 16 or a proportional control valve, as are known in the art.

When the hydrogen content of the exhaust gas increases, the output signal generated by the hydrogen sensor increases. This increased output signal applied to the base of transistor 114 decreasing its conduction and increasing the potential at junction 106. This effectively displaces the whole sawtooth wave in a positive direction. The positive portion of the square wave generated by the comparator 116 will increase and the positive portion of the square wave at the output terminal will decrease, resulting in a decrease in the quantity of hydrogen supplied to the engine by valve 16.

Conversely, if the hydrogen content of the exhaust gas decreases, the output of the hydrogen sensor will decrease, thereby increasing the conductance of transistor 114 and lowering the bias potential at junction 106. The sawtooth wave will be displaced downward towards ground and the positive portion of the square wave at the output terminal 128 will increase causing an increased fuel delivery to the engine. It would be evident to one skilled in the art that the control functions of embodiment shown on FIG. 3 could be reversed and that foot pedal 20 could directly control the actuation of hydrogen control valve 16. The signals generated by the electronic control unit 44 would then control the actuation of the air control valve 14.

Figure 6:
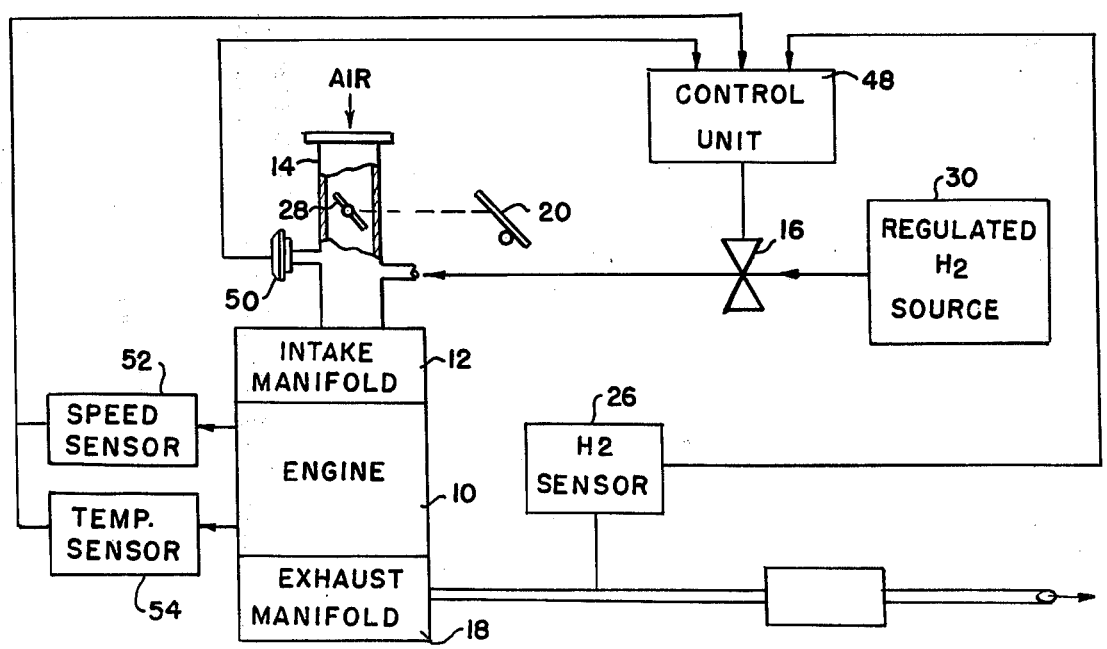
FIG. 6 is a block diagram of the preferred embodiment of the closed loop fuel control system having an electronic control unit receiving inputs from engine sensors and the hydrogen sensor.

A more sophisticated embodiment of the closed loop hydrogen fuel control system is illustrated in FIG. 6. An engine 10 having an intake manifold 12 and exhaust manifold 18 receives air or oxygen from an air control valve 14, such as butterfly valve 28 controlled in response to the actuation of an operator's accelerator pedal 20. Hydrogen fuel is supplied to the intake manifold from a regulated source of hydrogen 30 by means of electrically controlled valve 16 activated in response to signals from an electronic control unit 48. Control unit 48 also receives inputs from a pressure sensor 50, a speed sensor 52, a temperature sensor 54, and a hydrogen sensor 26. Electronic control unit 48 responds to these inputs and generates signals controlling the delivery of the hydrogen fuel to the engine. The control unit 48 may be embodied in an analog or digital form, as is known in the art.

The operation of the system is as follows: Air is emitted to the intake manifold by means of valve 14 under direct control of the operator by means of foot pedal 20. The electronic control unit, in response to the inputs from the pressure sensor, speed sensor and temperature sensor, compute the required amount of fuel required by the engine and generates a signal controlling the actuation of the electronically controlled valve 16. As previously discussed with reference to FIGS. 2 and 3, the hydrogen sensor detects concentration of hydrogen in the exhaust gases and generates a signal indicative of the hydrogen concentration in the exhaust manifold. The output of the hydrogen sensor 26 is applied to the control unit and modifies the signal generated in response to the pressure sensor, speed sensor and temperature sensor. When the quantity of hydrogen gas in the exhaust gas is less than the desired amount, the output of the hydrogen sensor causes the control unit 48 to increase the quality of hydrogen being supplied to the engine. Alternatively, when the quantity of hydrogen in the exhaust gas is greater than the predetermined amount, the output of the hydrogen sensor causes the control unit 48 to decrease in the quantity of hydrogen being delivered to the engine.

In an alternate embodiment (not shown) the position of the foot pedal 20 may be indicative of a desired engine torque. In this embodiment, a signal indicative of the foot pedal is input directly into the control unit 48 and the control unit computes both the quantity of air and fuel to be admitted to the engine, as taught by Zechnall in U.S. Pat. No. 3,750,632 (August 1973). Servo systems then control the actuation of both the air control valve 14 and the fuel control valve 16 in response to signals generated by the control unit. The output signal of the hydrogen sensor 26 may also be input to the control unit 48 to correct or trim the quantity of hydrogen fuel or air emitted to the engine, as discussed with reference to FIG. 6.

Figure 7:
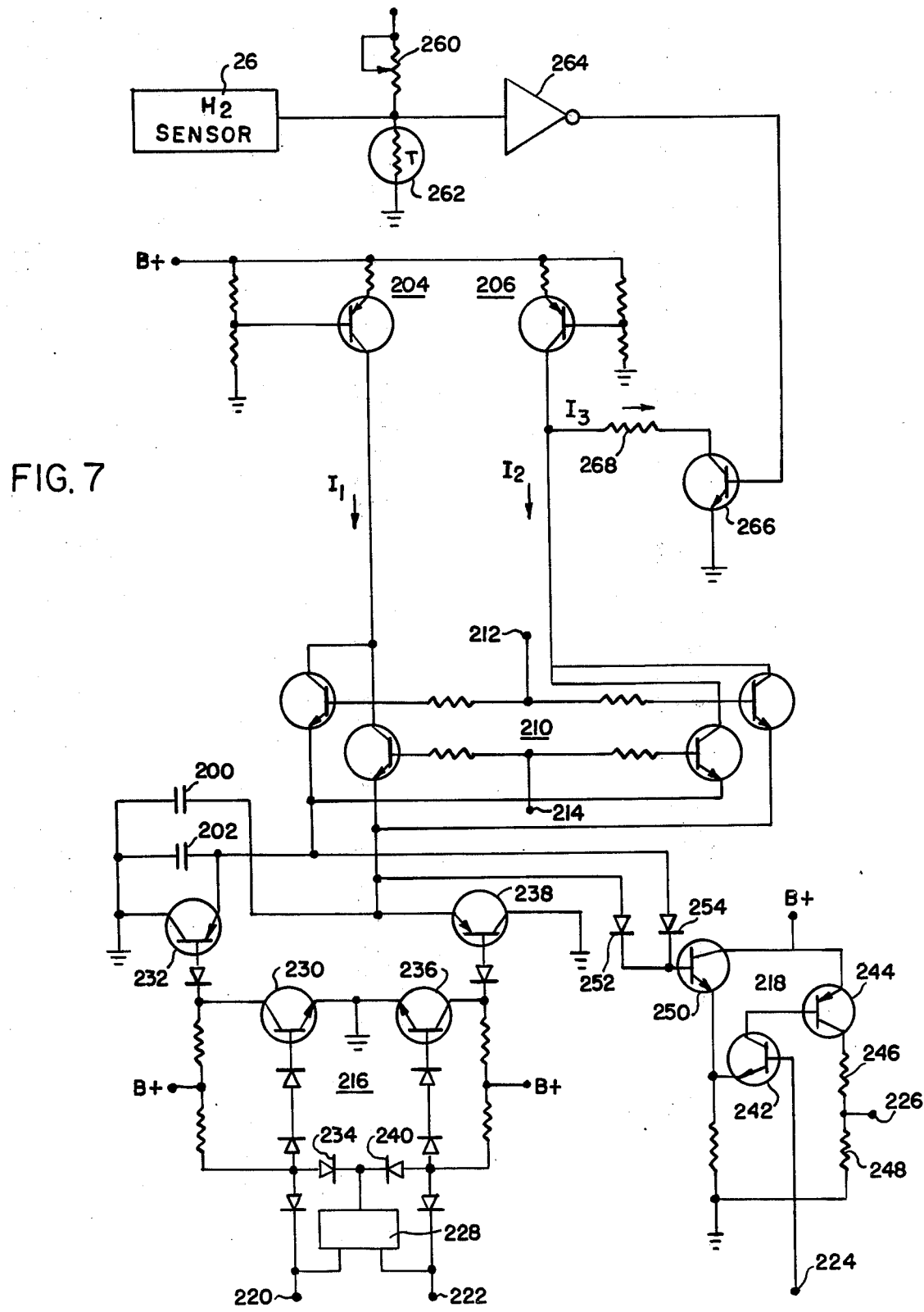
FIG. 7 is a schematic of the electronic control unit of FIG. 6.

A circuit implementation of the control unit 48 of FIG. 6 is illustrated in FIG. 7. The basic electronic control unit 48, by way of example, is of the analog type disclosed by Reddy in U.S. Pat. No. 3,734,068, "Fuel Injection Control System". However, any other analog or digital control unit, including a microcomputer, may be used in conjunction with the hydrogen closed loop system, as previously indicated. The Reddy circuit shown is powered from a source of electrical energy designated at various points on the diagram as B+. The source of electrical power may be a battery or engine driven source, such as an alternator or generator conventionally associated with an internal combustion engine. The electronic control unit 48 has two capacitors 200 and 202 alternately charged by means of a pair of current sources 204 and 206 under the control of a switching network 210. The switching network receives engine speed data in the form of trigger signals at input terminals 212 and 214 from a timing circuit (not shown), synchronized with the rotation of the engine.

The pulse generating circuit comprises a discharge circuit 216 and a comparator circuit 218. The discharge circuit 216 also receives the timing signals from the timing circuit at input terminals 220 and 222, while the comparator circuit 218 receives a load signal at terminal 224, such as a signal from a pressure sensor generating a signal indicative of the pressure in the engine's air intake manifold. The comparator 218 generates an output pulse signal at terminal 226 indicative of the engine's fuel requirements in response to the potentials on capacitors 200 and 202 and the value of the pressure signal.

The operation of the electronic control unit is discussed with reference to FIG. 7 and the waveforms shown in FIG. 8. Current source 204 is a constant current source capable of charging capacitors 200 and 202 at a predetermined rate to a predetermined value indicated at point C on FIG. 8. Current source 206 is also a constant current source having a constant current output signal operative to charge capacitors 200 and 202 at a predetermined rate to potentials above the predetermined value of current source 204. The output of the speed sensor 52 are trigger signals TR1 and TR2 which are generated in timed sequence with the rotation of the engine. The trigger signals TR1 and TR2, in the form of two alternating square waves, as illustrated in FIG. 8, are respectively applied to input terminals 212 and 214 of switch 210 and control the sequential charging of the capacitors 200 and 202 by the two current sources 204 and 206. In the interval when the signal TR1 is positive and the signal TR2 is negative, or a ground potential, capacitor 202 is charged by current source 204 and capacitor 200 is charged by current source 206. When the trigger signals reverse polarity, the two capacitors are charged by the alternate current source.

The leading edges of the trigger signals TR1 and TR2, applied to the discharge circuit 216, activates a delay pulse generator 228, such as a single shot multivibrator which generates a delay pulse "p" having a predetermined pulse width significantly shorter than pulse width of the trigger pulse. A positive trigger signal on input terminal 220 coincident with the positive delay pulse signal "p" removes the effective ground potential on the base of transistor 230 causing it and transistor 232 to conduct. Transistor 232 discharges capacitor 202 to near ground potential during the period of the delay pulse. Termination of the delay pulse returns a ground potential at the output of the delay pulse generator 228 which is applied to the base of transistor 230 through diode 234. The ground signal at its base blocks transistor 230 which in turn blocks transistor 232 permitting capacitor 202 to be charged by current source 204 to the predetermined value. When the trigger signals TR1 and TR2 change polarity, a positive potential is applied to terminal 222 and the delay pulse "p" permits the base of transistor 236 to be forward biased and capacitor 200 is discharged by means of transistor 238 in a manner equivalent to the way capacitor 202 was discharged. The switching network 210 also changes state in response to the inversion of the trigger signals and capacitor 202 is charged from current source 206 and capacitor 200 is charged from current source 204.

The pressure signal from pressure sensor 50 is applied to pressure input terminal 224 and forward biases transistor 242 which in turn forward biases transistor 244. The conductance of transistor 244 produces a positive potential at output terminal 226 which is connected to the junction between resistances 246 and 248 forming a voltage divider network between the collector of transistor 244 and ground. The conductance of transistor 242 also biases the emitter of transistor 250 to a potential approximately equal to the value of the pressure signal appearing at terminal 224. The charge signals on capacitor 200 and 202 are applied to the base of transistor 250 through diodes 252 and 254, respectively. When the signals on both capacitors have a potential value below the value of the pressure signal, transistor 250 is blocked. However, when the potential value on either capacitor 200, 202 or both, exceed the value of the pressure signal, transistor 250 conducts. Conductance of transistor 250 raises the value of the potential appearing at the emitter of transistor 242 above the value of the pressure signal applied to its base thereby blocking transistor 242. Blocking of transistor 242 blocks transistor 244 and with transistor 244 in the blocked state, the potential at output terminal 226 assumes a ground potential terminating the output signal.

The voltage waveforms generated across capacitors 200 and 202 in response to a series of trigger signals TR1 and TR2 and the delayed pulse "p" are shown in FIG. 8. The decreasing period of the sequential trigger signals illustrated is an exaggerated example of the change in the pulse width of the trigger signals as a function of engine speed. Referring to the waveform for capacitor 202, the initial segment from A to B is generated when TR1 is positive and the delay pulse generating circuit is producing a dely pulse "p" discharging capacitor 202. Upon termination of the delay pulse "p", point B, capacitor 202 begins to charge at a rate determined by current source 204 to its predetermined value indicated as point C. The charge on capacitor 202 remains at the predetermined value indicated as point C. The charge on capacitor 202 remains at the predetermined value for the remainder of the positive portion of the trigger signal TR1. At point D, the trigger signals TR1 and TR2 reverse polarity and capacitor 202 is now charged by the current source 206 during the interval from D to E which is equal to the interval when the trigger pulse TR2 is positive.

When the charge on either capacitor 200 or 202 reaches the value of the signal applied to the emitter of transistor 250, point F, the signal at the output terminal 226 is a ground potential. At the occurrence of a trigger signal, the capacitor which was being charged by current source 206 is discharged to approximately ground potential by the discharge circuit 216 and the charge on the capacitor being charged by current source 204 is below the value of the signal applied to the emitter of the transistor 250, which is indicative of the value of the pressure signal. Since the charge on both capacitors is below the value of the pressure signal, transistor 250 is blocked, which renders transistors 242 and 244 conductive generating a positive signal at output terminal 226 having a value determined by the respective value of resistances 246 and 248. The signal at output terminal 226 remains positive until the charge on the capacitor being charged by current source 206 exceeds the value of the pressure signal. When the charge on the capacitor exceeds the value of the pressure signal, point F, on the segment DE, transistors 242 and 244 become blocked and the signal at the output terminal 226 returns to ground potential. The time interval, when the signal at output terminal 226 is positive, is indicative of the engine's fuel requirements as a function of engine speed and the pressure in the intake manifold.

Referring back to FIG. 7, the circuit details of the closed loop portion of the circuit will be discussed. The hydrogen sensor 26 detects the partial pressure of hydrogen in the exhaust gas and generates an output signal. This signal is summed with the output of the set point generator comprising variable resistance 260 and the temperature sensor 54 illustrated as positive temperature coefficient resistor 262 connected between B+ and ground. One skilled in the art will recognize that other types of temperature sensors, such as a thermistor, could be used with appropriate changes to the circuit without departing from the set point concept. The sum signal is input to amplifier 40 which in this particular circuit is an inverter amplifier 264. The output of the inverter amplifier 264 is applied to the base of transistor 266. The collector of transistor 266 is connected to the output of constant current source 206, through resistance 268.

The operation of this circuit will now be discussed under various operating conditions. First, it is assumed that the engine is at its normal operating temperature and the hydrogen content of the exhaust gas is at its predetermined value. The sum of the output from the hydrogen sensor 26 and the set point generator is input to the inverter amplifier which generates an output signal applied to the base of transistor. This places transistor 266 in a partial conductive state, which through resistance 268, sinks a predetermined portion $I_3$ of the current $I_2$ from current output source 206.

Referring now to FIG. 9, when the hydrogen content of the exhaust gas is at its predetermined level, capacitors 200 and 202 are charged at a rate during the second interval indicated by the solid line 270. The charging current is the output current $I_2$ of constant current source 206 minus the current $I_3$ drained by transistor 266.

If the hydrogen content of the exhaust increased, indicative that the control system is inputting excessive hydrogen fuel to the engine, the output of the hydrogen sensor increases and the output of inverter amplifier decreases. The decreased output of the inverter amplifier 264 decreases the amount of current $I_3$ being drained from the constant current source 206 by transistor 266. This causes capacitances 200 and 202 to be charged at a faster rate, as indicated by dashed line 272 decreasing the pulse widths of the injection pulses thereby decreasing the quantity of hydrogen being supplied to the engine.

If the hydrogen content of the exhaust decreases, the output of the hydrogen sensor 26 decreases, and the output of the inverter amplifier 264 increases. This increases the conductance of transistor 266. Drain current $I_3$ flowing through transistor 266 increases, which decreases charging current $I_2$ thereby decreasing the rate at which capacitances 200 and 202 are charged, as indicated by line 274 on FIG. 9. Decreasing the charging rate of capacitances 200 and 202 increases the pulse width of the injection pulses, increasing the quantity of fuel being supplied to the engine, as required.

Immediately after starting a cold engine, it is desirable to operate the engine with a rich air/fuel mixture until the engine reaches a nominal operating temperature. This function may be provided by including a separate drain circuit, draining a portion of the output current $I_2$ of the constant current source 206 or may be included in the set point generator, as shown. The advantage of this latter approach shall be explained hereinafter. The temperature sensor 54, shown as a positive temperature coefficient (PTC) resistance 262, has a resistance value which is a direct function of the engine temperature. When the engine is cold, the resistance of thermistor 262 is low, decreasing the output potential of the set point generator 36 which effectively increases the bias at base of transistor 266. This increases the drain current through transistor 266 and decreases the rate at which capacitances 200 and 202 are charged by source 206. The excess hydrogen is sensed by the $H_2$ sensor which causes an increase in the output of the $H_2$ sensor. By appropriate selection of resistance 260 and PTC resistor 262, the combined signals of the set point generator and the hydrogen sensor can be made to appear at the input of inverter amplifier 264, as if the engine was operating at its normal operating temperature and the hydrogen content of the exhaust gas was lower than the predetermining quantity, therefore, the desired warm-up enrichment is achieved.

As an alternative to the pulse width modulation control system as discussed with reference to FIG. 7, the injection signal generated by the control unit 48 may be pulse division modulated, as described in "Reference Data for Radio Engineers", Howard Sams & Co., 6th edition, 1975, pp. 23-13 through 23-19.

Figure 10:
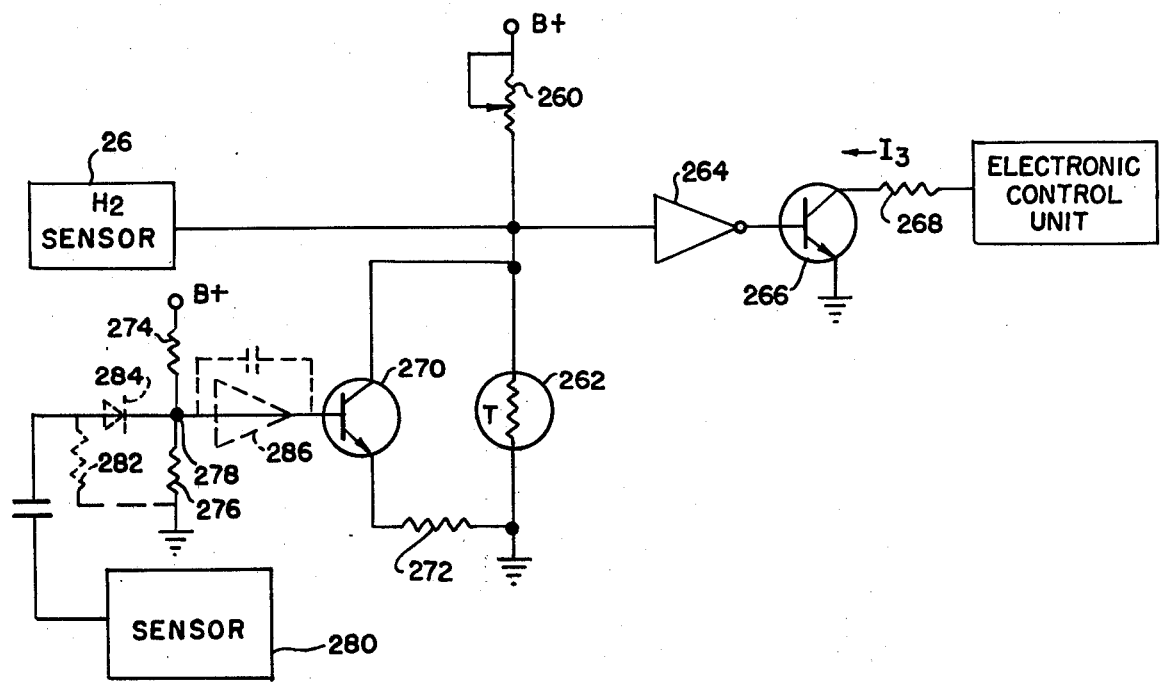
FIG. 10 is an electrical schematic of an alternate embodiment providing for fuel enrichment during a transient mode of operation.

A further embodiment of the closed loop portion of the circuit shown on FIG. 7 to provide for acceleration enrichment is illustrated on FIG. 10. Since the basic portion of the control unit 48 is the same as shown on FIG. 7, its details are not repeated. As in FIG. 7, the circuit comprises the temperature sensor 26, the set point generator consisting of variable resistance 260 and positive temperature coefficient resistance 262, inverter amplifier 264, transistor 266 and resistance 268. In this embodiment a transistor 270 and resistance 272 are connected in parallel with the PTC resistance 262. The base of transistor 270 is connected to the junction 278 between resistances 274 and 276 which form a voltage divider between B+ and ground potential. The output of a sensor 270 indicative of a change in the engine's mode of operation is communicated to junction 278 through a capacitance 282. The sensor 270 may be the pressure sensor 50 or a throttle sensor sensing the position or movement of the throttle as is well known in the art.

The operation of this embodiment is as follows: When the output of the sensor 280 is zero or a constant value, the current flow through transistor 270 is controlled by the bias potential applied to its base by the voltage divider comprising resistances 274 and 276 and the voltage drop across resistance 272. The set point potential at the junction between resistance 260 and the parallel connected PTC resistance and transistor 270 is the desired nominal value for the proper operation of the circuit, as described with reference to the circuit shown on FIG. 7.

When a change in the engine's mode of operation is commanded, the output of sensor 280 changes. This changing output signal is passed by capacitance 282 and applied to the base of transistor 270. When the change is indicative of a demand for acceleration, the potential at the base of transistor 270 is increased, increasing the conductivity of the transistor and lowering the potential at the junction of the set point generator. This in turn increases the conductivity of transistor 266, which as previously described, increases the duration of the injection pulses generated by the electronic control unit.

If the change is indicative of a demand for deceleration, the current flow through transistor 270 decreases effectively raising the potential at the junction of the set point generator and the length of the injection pulses is decreased.

As previously discussed with reference to FIG. 7, the hydrogen sensor maintains limited control over the circuit during the transient modes of operation.

If only fuel enrichment during acceleration is desired, a resistance 282 and diode 284, shown in phantom, may be added as shown. Also, if it is desired to increase the period of fuel enrichment, an integrator such as integrator 286, shown in phantom, may be added. These, as well as other techniques well known in the art, may be used to modify the signal from sensor 270 to meet the fuel requirements of the engine during transient conditions.

Figure 11:
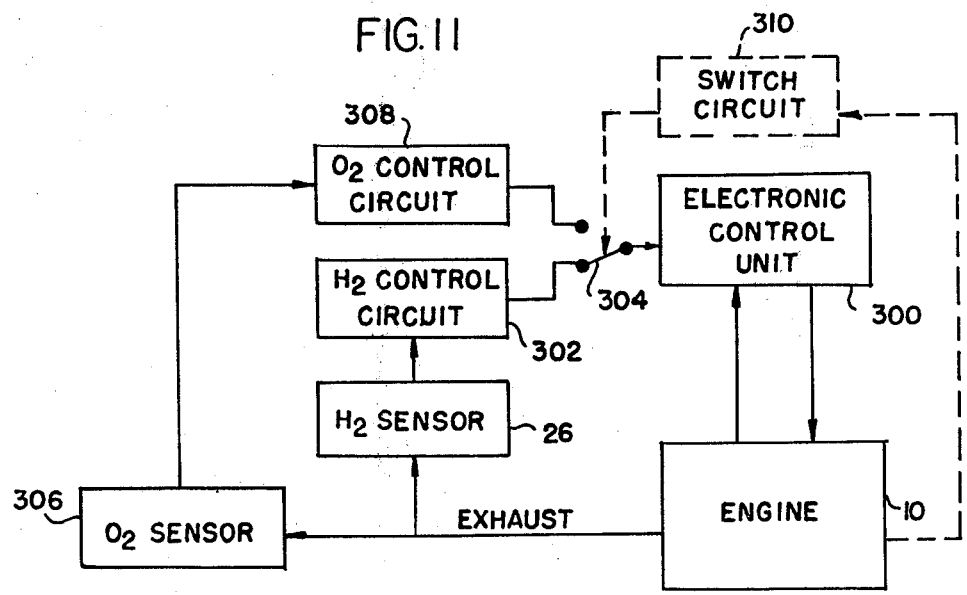
FIG. 11 is an alternate embodiment including an oxygen closed loop system to provide for lean operation under selected conditions.

Another embodiment of the invention is illustrated in FIG. 11. This embodiment further includes an oxygen closed loop fuel control system such as taught by Seitz in U.S. Pat. No. 3,815,561, "Closed Loop Engine Control System" (June 1974), which permits the engine to be operated with a lean (oxygen rich) air/fuel mixture rather than the hydrogen rich air/fuel mixture taught in the previous embodiments. This embodiment has the advantage that when the engine load is light and not subject to frequent change such as when driving on an open highway or a freeway in contrast to stop and start city conditions, the system may be switched from the rich hydrogen closed loop system to the lean oxygen closed loop system. The switching may be accomplished manually by the operator or automatically in response to predetermined engine operating conditions, such as engine speed, manifold pressure, throttle position, or any other.

Referring now to FIG. 11, the fuel supply to the engine 10 is controlled by an electronic control unit 300 in response to one or more of the engine's operation parameters. The hydrogen sensor 26 sensing the engine's exhaust operates as previously described and inputs a signal indicative of the exhaust hydrogen content into a hydrogen control circuit 302, which in turn generates a signal which is communicated to the electronic control unit 300 through a switch 304. This closed loop system may be of the type discussed with reference to FIG. 6. In a like manner, an oxygen sensor 306 generates a signal indicative of the oxygen content of the engine's exhaust which is communicated to an oxygen control circuit 308. The oxygen control unit in turn generates a signal which is communicated to the electronic control unit 300 through switch 304. The oxygen closed loop system may be identical to that disclosed in the Seitz patent cited above, or any other oxygen closed loop system known in the art.

The position of switch 304 determines whether the output signals generated by the electronic control unit 300 will be corrected or trimmed by the output of the hydrogen control circuit 302 or the oxygen control circuit 308. Switch 304 may be a manual operator actuated switch or a switch actuated in response to predetermined engine operation parameters. For example, switch 304 may be a mechanical or a solid state switch activated in response to the output of a switch circuit 310 shown in phantom. The switch circuit may receive a signal indicative of the engine speed and a signal indicative of the dynamic state of the pressure in the engine's intake manifold. The circuit 310 may be operative to produce a signal first activating switch 304 to apply the signal generated by the hydrogen control circuit 302 to the electronic control unit 300 when the engine speed is below a predetermined speed and operative to generate a second signal activating switch 304 to apply the output of oxygen control circuit 304 to the electronic control unit 300, when the engine speed is above the predetermined speed and the manifold pressure is not changing indicating the absence of an acceleration condition. As is well known, other signals may be used in place of the speed and the pressure signals to indicate a steady high speed mode of operation, such as would be encountered during open highway or expressway driving conditions. This may also be done digitally by counting a predetermined number of injection pulses having nearly identical pulse widths or pulse intervals.

Having described the closed loop hydrogen control system with respect to several different embodiments, it is not intended that the invention be limited to those discussed and illustrated in the drawings. It is recognized that a person skilled in the art will be able to devise alternate embodiments without departing from the spirit of the invention.

What is claimed is:

1. A closed loop fuel control system for a hydrogen fuelled engine having a source of hydrogen fuel comprising:

air control means for controlling the quantity of air being delivered to the engine in response to the command of an operator;

means for generating an air quantity signal indicative of the quantity of air being delivered to the engine;

means for generating a hydrogen feedback signal having a value indicative of the concentration of unburned hydrogen in the residue of the engine's combustion process emitted as an exhaust gas; and fuel control means for controlling the quantity of hydrogen being delivered to the engine from the hydrogen source in response to said air quantity signal and said hydrogen feedback signal to provide a combustible mixture of air and hydrogen having a predetermined concentration of unburned hydrogen in said exhaust gas.

2. The fuel control system of claim 1 wherein said fuel control means comprises:
   electrically controlled pressure regulator means having an input receiving hydrogen fuel from said source and an output for delivering said hydrogen fuel at a pressure controlled by the value of said feedback signal; and
   mechanically actuated valve means receiving hydrogen fuel from the output of said pressure regulator means for controlling the quantity of hydrogen fuel delivered to said engine;
   and wherein said means for generating an air quantity signal is means for linking the operator's command to said air control means to said mechanically actuated valve means, said means for linking operative to open and close said valve as a function of the commanded quantity of air being delivered to the engine.

3. The fuel control system of claim 1 wherein said means for generating an air quantity signal is a means actuated by said air control means for generating an electrical signal indicative of the commanded quantity of air being delivered to the engine;
   and wherein said fuel control means comprises:
   circuit means for combining said electrical signal with said hydrogen feedback signal to generate a composite signal indicative of the engine's fuel requirements; and
   electromechanical valve means disposed between said engine and said source of hydrogen fuel for controlling the quantity of hydrogen fuel delivered to the engine in response to said composite signal.

4. The fuel control system of claim 1 wherein said engine includes engine sensors generating signals indicative of the engine's operating parameters including said means for generating an air quantity signal, said fuel control means comprises means for generating fuel control signals indicative of the engine's fuel requirements in response to said signals indicative of the engine's operating parameters and said hydrogen feedback signal; and
   valve means disposed between said source of hydrogen fuel and said engine for controlling the quantity of fuel delivered to the engine in response to said fuel control signals.

5. The fuel control system of claim 4 wherein said fuel control signals are pulse width modulated signals and said valve means is at least one ON-OFF valve opening and closing in response to said pulse width modulated signals.

6. The fuel control system of claim 5 wherein said at least one ON-OFF valve is a plurality of ON-OFF valves.

7. The fuel control system of claim 4 wherein said valve means is a proportional valve delivering a continuous quantity of fuel to the engine at a rate proportional to said fuel control signals.

8. The fuel control system of claim 4 wherein said engine includes an air intake manifold and said air control means is a throttle valve controlling the air flow through said intake manifold, said means for generating an air quantity signal comprises:
   a pressure sensor for generating a pressure signal indicative of pressure in said intake manifold; and
   a speed sensor for generating a speed signal indicative of the engine speed; and
   wherein said fuel control means generates said fuel control signals in response to said pressure signal, said speed signal and said hydrogen feedback signal.

9. The fuel control system of claim 8 wherein said engine has a nominal operating temperature and said engine sensors further includes a temperature sensor generating temperature signals indicative of the engine's temperature, said fuel control means is further responsive to said temperature signal to generate fuel control signals providing an enriched air/fuel mixture to the engine when the engine's temperature is below its nominal operating temperature, said air/fuel mixture being enriched as an inverse function of the engine's temperature.

10. The fuel control system of claim 1 wherein said fuel control means further includes:
    transient mode means for changing the quantity of fuel delivered to the engine by said fuel control means in response to a transient mode signal indicative of a change in the operating mode of the engine; and
    means for generating said transient mode signal in response to at least one operating parameter of the engine.

11. The fuel control system of claim 10 wherein said means for generating said transient mode signal is said means for generating an air quantity signal.

12. The fuel control system of claim 1 wherein said system further includes:
    means for generating an oxygen feedback signal indicative of the concentration of unconsumed oxygen in the residue of the engine's combustion process; and
    switch means for controlling the response of said fuel control means between said hydrogen feedback signal and said oxygen feedback signal;
    wherein said fuel control means provides a hydrogen rich air/fuel mixture to the engine in response to said hydrogen feedback signal and an oxygen rich air/fuel mixture to the engine in response to said oxygen feedback signal.

13. The closed loop system of claim 12 wherein said switch means is an operator actuated manual switch.

14. The closed loop system of claim 12 wherein said switch means comprises:
    a switch selectively interconnecting said means for generating a hydrogen feedback signal and said means for generating an oxygen feedback signal with said fuel control means in response to a switch signal; and
    means for generating said switch signal in response to at least one engine operating parameter indicative of the operating mode of the engine.

15. A closed loop fuel control system for a hydrogen fuelled engine, wherein said engine includes a source of hydrogen fuel and an engine control, the position of which is indicative of a commanded engine torque, comprising:
    means for generating a hydrogen feedback signal having a value indicative of the concentration of unburned hydrogen in the residue of the engine's combustion process emitted as an exhaust gas; and means for controlling the quantity of hydrogen and an oxidizing agent delivered to the engine in response to the position of said engine control and said hydrogen feedback signal to cause the engine to generate the commanded torque with the exhaust gas having a predetermined quantity of unburned hydrogen.

16. The control system of claim 15 wherein said oxidizing agent is air.

17. The control system of claim 15 wherein said oxidizing agent is oxygen.

18. The fuel control system of claim 15 wherein said control means comprises:

means mechanically actuated by said engine control for controlling the quantity of fuel being delivered to the engine;

means for generating a hydrogen signal indicative of the quantity of hydrogen being delivered to the engine;

oxidizer control means for controlling the quantity of oxidizing agent being delivered to the engine in response to said hydrogen signal and said hydrogen feedback signal.

19. The system of claim 15 wherein said control means comprises:

oxidizer control means mechanically actuated by said engine control for controlling the quantity of said oxidizing agent being delivered to the engine;

means for generating an oxidizer quantity signal indicative of the quantity of the oxidizing agent being delivered to the engine; and fuel control means for controlling the quantity of hydrogen being delivered to the engine in response to said oxidizer quantity signal and said hydrogen feedback signal.

20. The fuel control system of claim 19 wherein said fuel control means comprises:

electrically controlled pressure regulator means having an input receiving hydrogen fuel from said source and an output for delivering said hydrogen fuel at a pressure controlled by the value of said feedback signal; and mechanically actuated valve means receiving hydrogen fuel from the output of said pressure regulator means for controlling the quantity of hydrogen fuel delivered to said engine;

and wherein said means for generating an oxidizer quantity signal is means for linking the operator's command to said oxidizer control means to said mechanically actuated valve means, said means for linking operative to open and close said valve as a function of the commanded quantity of oxidizing agent being delivered to the engine.

21. The fuel control system of claim 20 wherein said means for generating an oxidizer quantity signal is a means actuated by said oxidizer control means for generating an electrical signal indicative of the commanded quantity of oxidizing agent being delivered to the engine;

and wherein said fuel control means comprises:

circuit means for combining said electrical signal with said feedback signal to generate a composite signal indicative of the engine's fuel requirements; and electromechanical valve means disposed between said engine and said source of hydrogen fuel for controlling the quantity of hydrogen fuel delivered to the engine in response to said composite signal.

22. The fuel control system of claim 19 wherein said engine includes engine sensors generating signals indicative of the engine's operating parameters including said means for generating an oxidizer quantity signal, said fuel control means comprises means for generating fuel control signals indicative of the engine's fuel requirements in response to said signals indicative of the engine's operating parameters and said feedback signal; and valve means disposed between said source of hydrogen fuel and said engine for controlling the quantity of fuel delivered to the engine in response to said fuel control signals.

23. The fuel control system of claim 22 wherein said fuel control signals are pulse width modulated signals and said valve means is at least one ON-OFF valve opening and closing in response to said pulse width modulated signals.

24. The fuel control system of claim 23 wherein said at least one ON-OFF valve is a plurality of ON-OFF valves.

25. The fuel control system of claim 22 wherein said valve means is a proportional valve delivering a continuous quantity of fuel to the engine at a rate proportional to said fuel control signals.

26. The fuel control system of claim 22 wherein said fuel control signals are pulse position modulated, and said valve means delivers a quantity of hydrogen proportional to said pulse position modulated signals.

27. The fuel control system of claim 22 wherein said engine includes an intake manifold and said oxidizer control means is a throttle valve controlling the oxidizing agent's flow through said intake manifold, said means for generating an oxidizer quantity signal comprises:

a pressure sensor for generating a pressure signal indicative of pressure in said intake manifold; and a speed sensor for generating a speed signal indicative of the engine speed; and wherein said fuel control means generates said fuel control signals in response to said pressure signal, said speed signal and said feedback signal.

28. The fuel control system of claim 27 wherein said engine has a nominal operating temperature and said engine sensors further includes a temperature sensor generating temperature signals indicative of the engine's temperature, said fuel control means is further responsive to said temperature signal to generate fuel control signals providing an enriched oxidizing agent fuel mixture to the engine when the engine's temperature is below its nominal operating temperature, said oxidizing agent fuel mixture being enriched as an inverse function of the engine's temperature.

29. The fuel control system of claim 19 wherein said control means further includes:

transient mode means for changing the quantity of hydrogen and oxidizing agent delivered to the engine by said control means in response to a transient mode signal indicative of a change in the operating mode of the engine; and means for generating said transient mode signal in response to at least one operating parameter of the engine.

30. The fuel control system of claim 29 wherein said means for generating said transient mode signal is said means for generating an oxidizer quantity signal.

31. The fuel control system of claim 14 wherein said oxidizing agent includes oxygen as one of its constituents, said system further includes:

means for generating an oxygen feedback signal indicative of the concentration of oxygen in the residue of the engine's combustion process; and switch means for controlling the response of said fuel control means between said hydrogen feedback signal and said oxygen feedback signal;

wherein said fuel control means provides a hydrogen rich fuel mixture to the engine in response to said hydrogen feedback signal and an oxygen rich fuel mixture to the engine in response to said oxygen feedback signal.

32. The closed loop system of claim 31 wherein said switch means is an operator actuated manual switch.

33. The closed loop system of claim 31 wherein said switch means comprises:

a switch for selectively connecting said means for generating a hydrogen feedback signal and said means for generating an oxygen feedback signal with said fuel control means in response to a switch signal; and means for generating said switch signal in response to at least one engine operating parameter indicative of the operating mode of the engine.

* * * * *